United States Patent
Zhuge et al.

(10) Patent No.: US 10,014,947 B2
(45) Date of Patent: Jul. 3, 2018

(54) MITIGATION OF ELECTRICAL-TO-OPTICAL CONVERSION IMPAIRMENTS INDUCED AT TRANSMITTER

(71) Applicants: Qunbi Zhuge, Kanata (CA); Kevin Farley, Ottawa (CA); Kim Roberts, Ottawa (CA); Maurice O'Sullivan, Ottawa (CA)

(72) Inventors: Qunbi Zhuge, Kanata (CA); Kevin Farley, Ottawa (CA); Kim Roberts, Ottawa (CA); Maurice O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/046,763

(22) Filed: Feb. 18, 2016

(65) Prior Publication Data
US 2017/0244489 A1    Aug. 24, 2017

(51) Int. Cl.
    *H04B 10/06*    (2006.01)
    *H04B 10/40*    (2013.01)
    *H04L 7/00*     (2006.01)
    *H04L 1/00*     (2006.01)

(52) U.S. Cl.
    CPC .......... *H04B 10/40* (2013.01); *H04L 1/0042* (2013.01); *H04L 7/0075* (2013.01)

(58) Field of Classification Search
    CPC  H04B 10/40; H04B 10/2507; H04B 10/2537; H04B 10/2543; H04B 10/255; H04B 10/2557; H04B 10/2563; H04B 10/25253; H04B 10/2513; H04B 10/613; H04B 10/616; H04B 10/6163; H04B 10/6165; H04B 10/697; H04L 1/0042; H04L 7/0075

USPC .......... 398/115, 158, 159, 208, 209
See application file for complete search history.

(56) References Cited

U.S. PATENT DOCUMENTS

| | | | |
|---|---|---|---|
| 7,457,538 B2 | 11/2008 | Strawczynski et al. | |
| 7,676,161 B2 | 3/2010 | Roberts et al. | |
| 7,769,305 B1 | 8/2010 | Roberts et al. | |
| 8,059,970 B2 | 11/2011 | Harley et al. | |
| 8,131,148 B2 | 3/2012 | Sun et al. | |
| 8,249,467 B2 | 8/2012 | Roberts et al. | |
| 2010/0067902 A1* | 3/2010 | Sun | H04B 10/0799 398/25 |
| 2012/0057863 A1* | 3/2012 | Winzer | H04B 10/60 398/3 |

FOREIGN PATENT DOCUMENTS

EP    2930865    10/2015

OTHER PUBLICATIONS

Ribbe, Extended European Search Report for EP17152918.3, dated Jul. 14, 2017.

* cited by examiner

*Primary Examiner* — M. R. Sedighian
(74) *Attorney, Agent, or Firm* — Integral Intellectual Property Inc.; Miriam Paton; Amy Scouten

(57) ABSTRACT

A digital instruction is generated regarding one or more electrical-to-optical conversion impairments induced at the transmitter of an optical communication system. The digital instruction may be used by the transmitter to reduce the impairments. Alternatively, or additionally, the digital instruction may be used by the receiver of the optical communication system to compensate for the impairments.

18 Claims, 10 Drawing Sheets

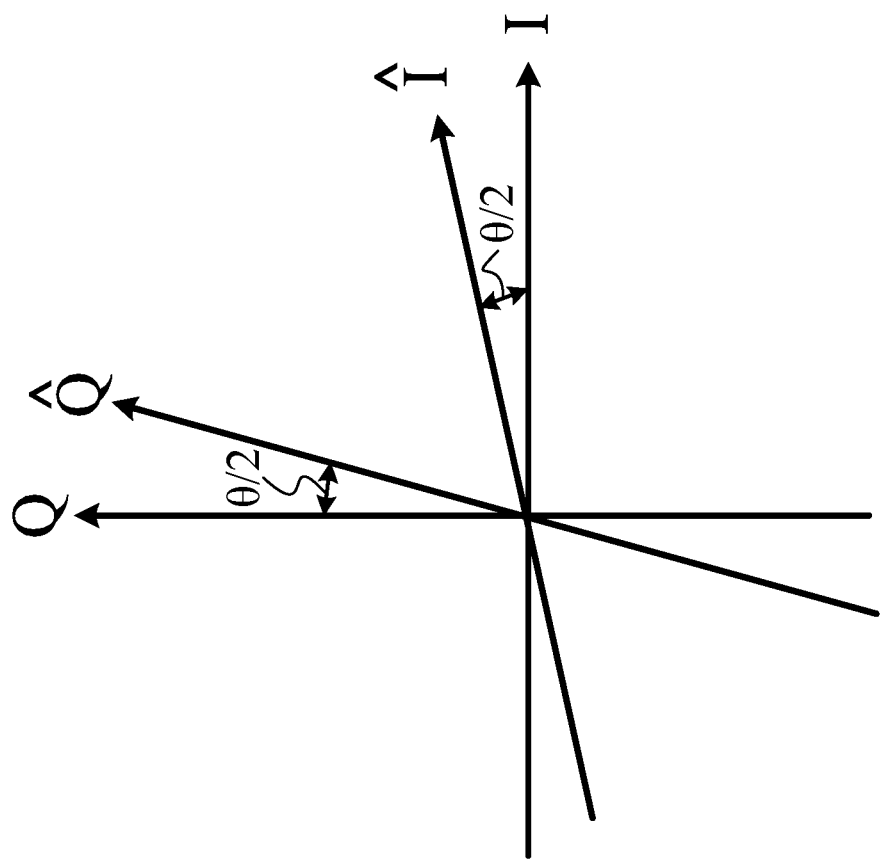

MITIGATION OF ELECTRICAL-TO-OPTICAL CONVERSION IMPAIRMENTS INDUCED AT TRANSMITTER

TECHNICAL FIELD

This document relates to the technical field of coherent optical communications and more specifically to the mitigation of electrical-to-optical conversion impairments induced at a transmitter.

BACKGROUND

Optical communication systems with higher spectral efficiency are being developed to satisfy the ever-increasing network capacity demand. As the cardinality of the signal modulation increases, the system performance becomes more sensitive to the impairments from the transmitter and the receiver. Electrical-to-optical conversion impairments induced at the transmitter diminish achievable transceiver performance.

SUMMARY

A digital instruction is generated regarding one or more electrical-to-optical conversion impairments induced at the transmitter of an optical communication system. The digital instruction may be used by the transmitter to reduce the impairments. Alternatively, or additionally, the digital instruction may be used by the receiver of the optical communication system to compensate for the impairments.

BRIEF DESCRIPTION OF THE DRAWINGS AND APPENDICES

Figure 1:
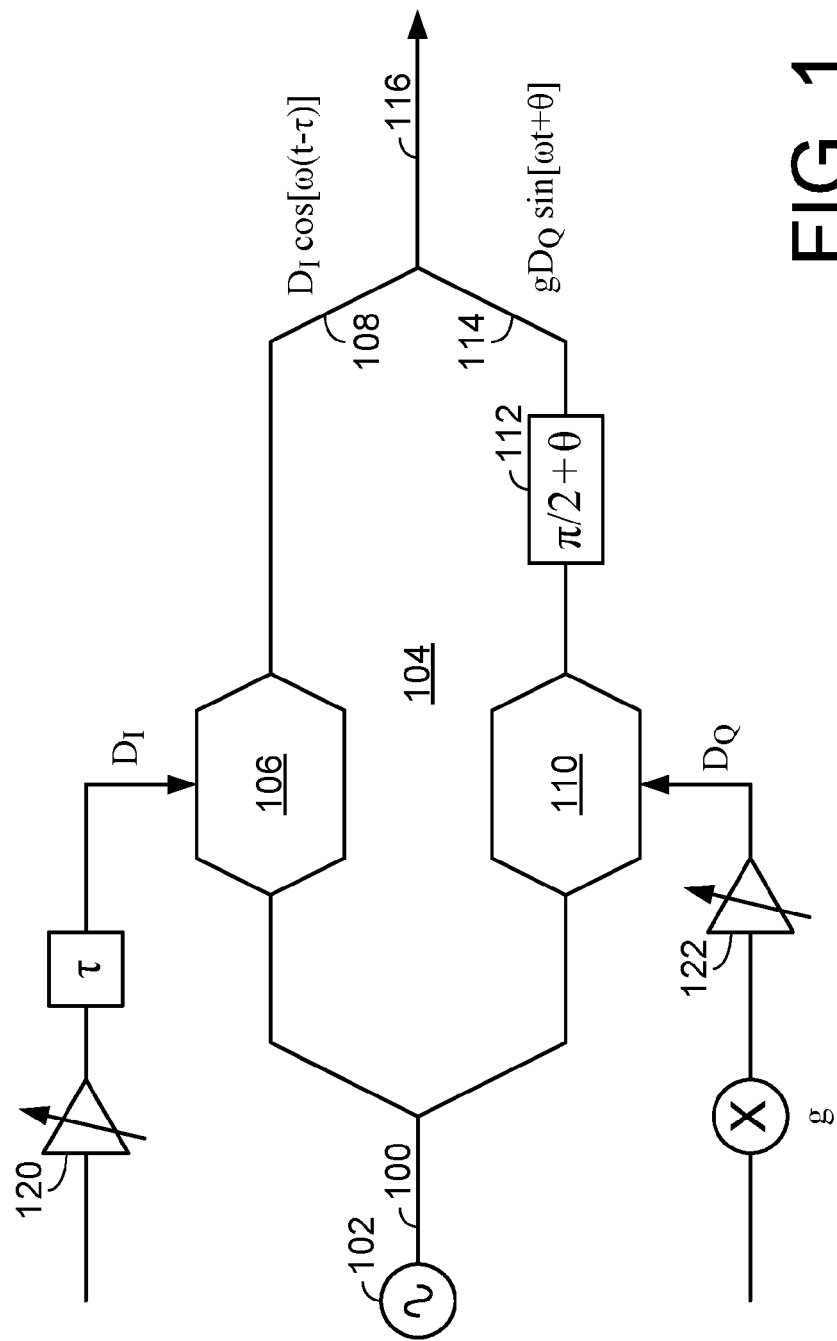
Figure 2:
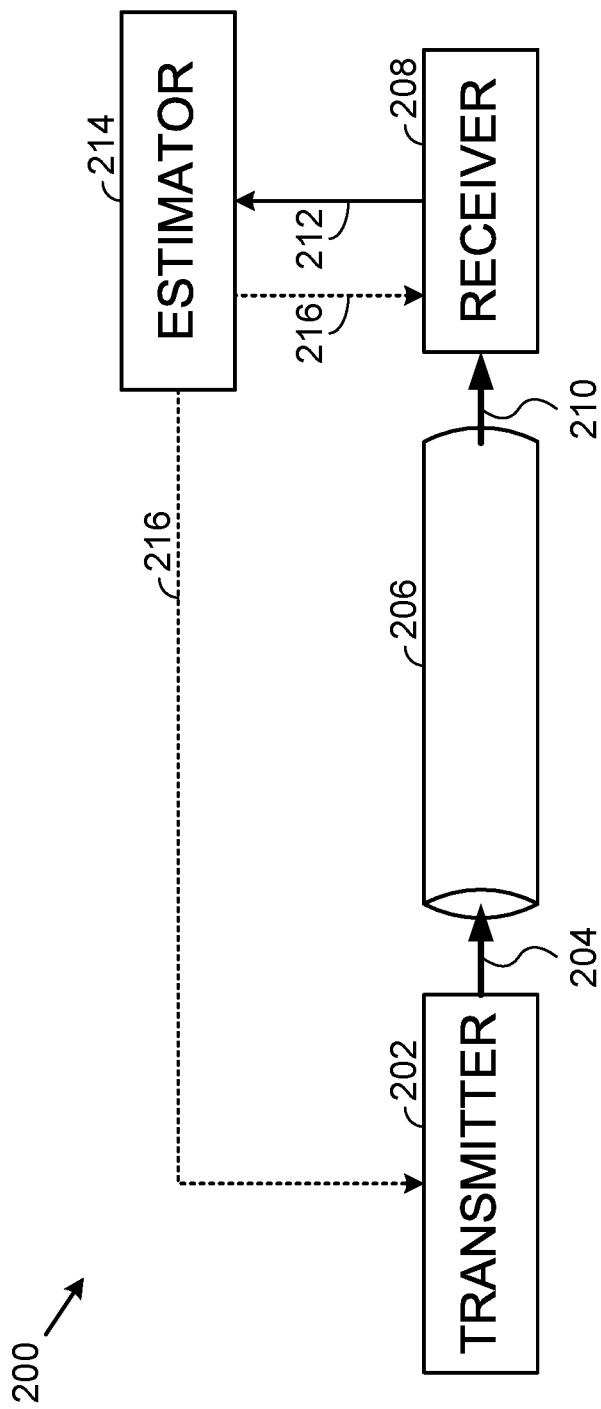
Figure 3:
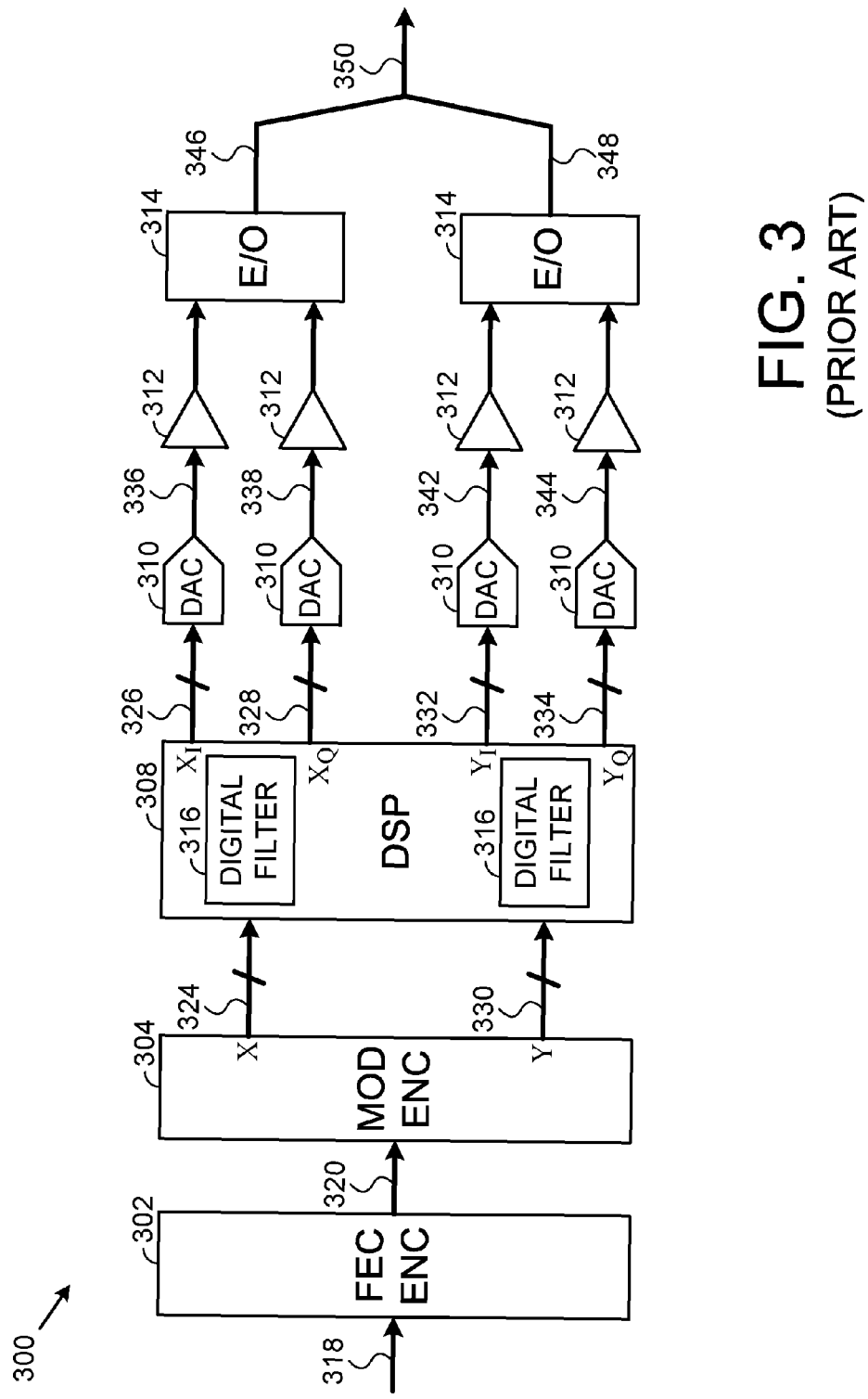
Figure 4:
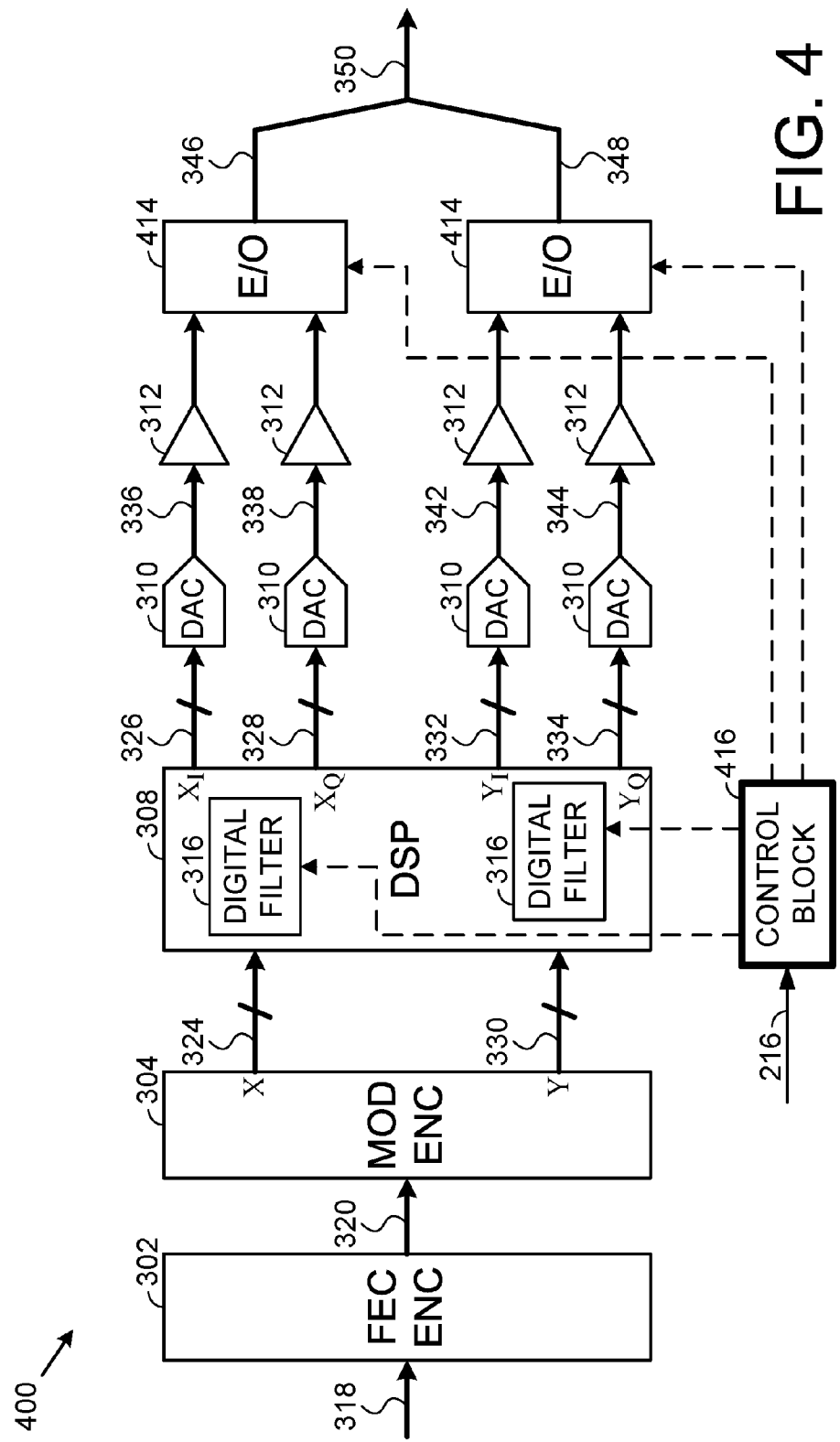
Figure 5:
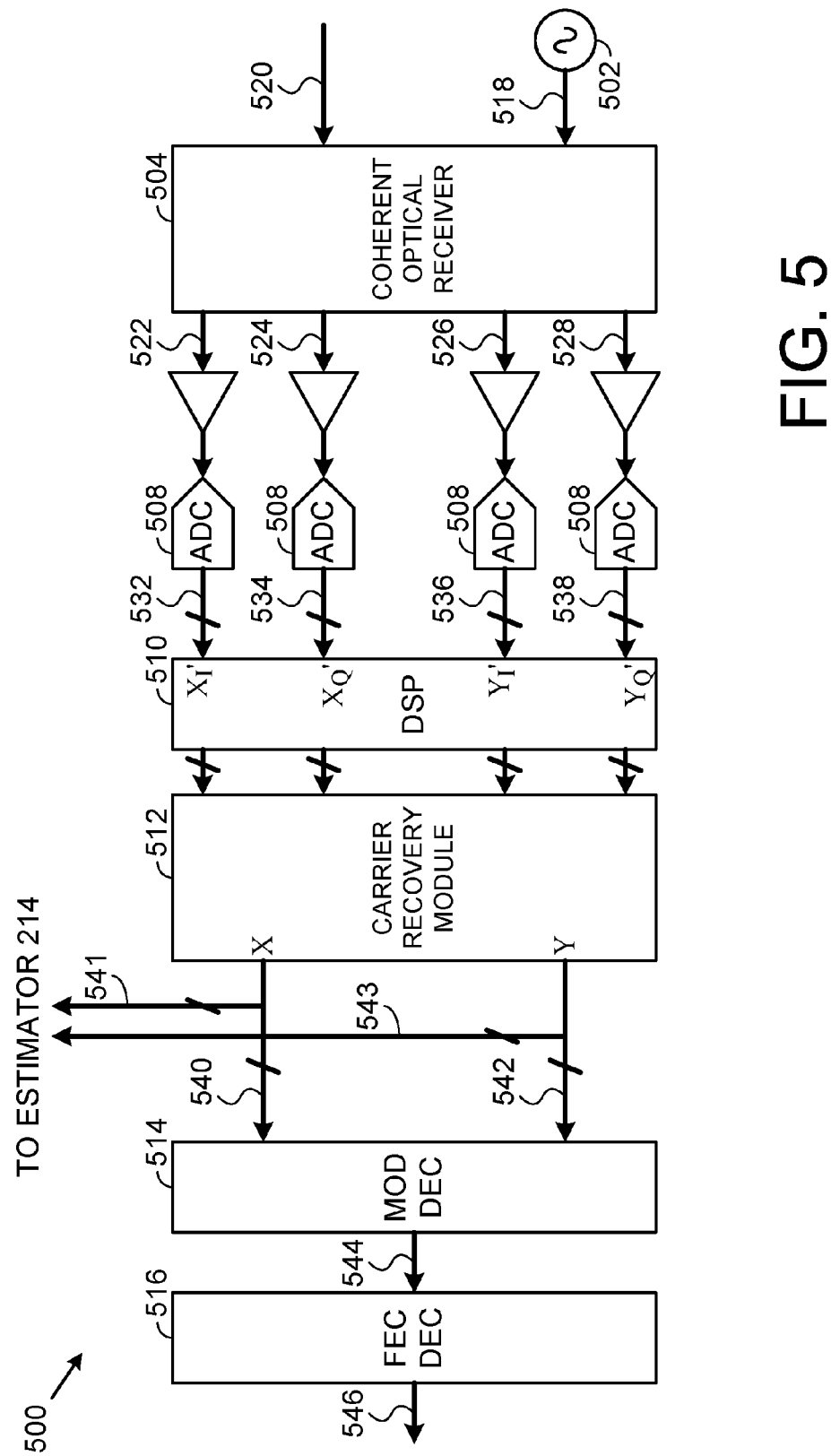
Figure 6:
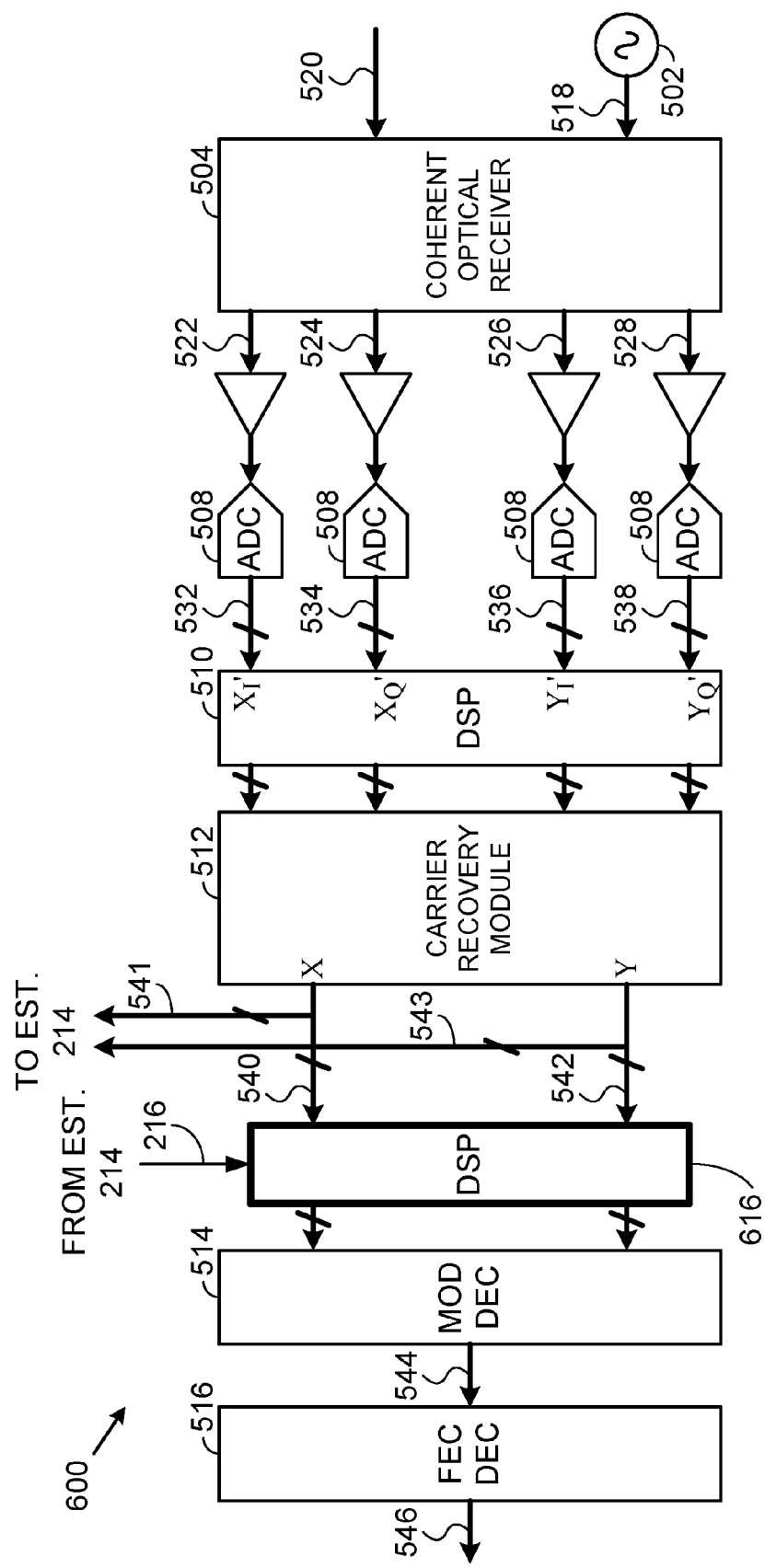
Figure 7:
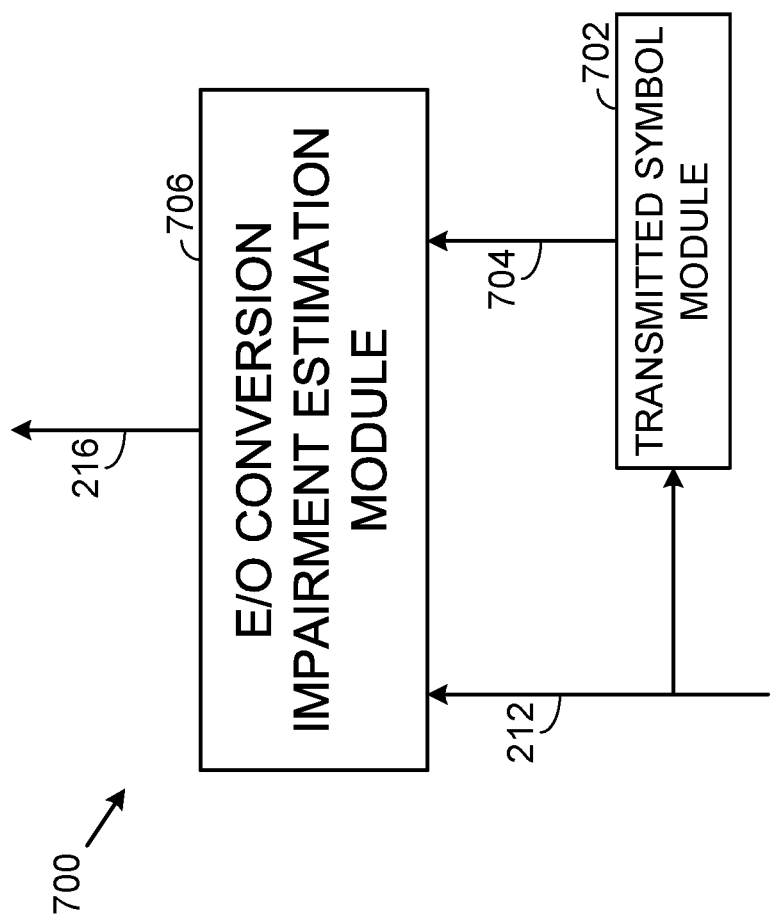
Figure 8:
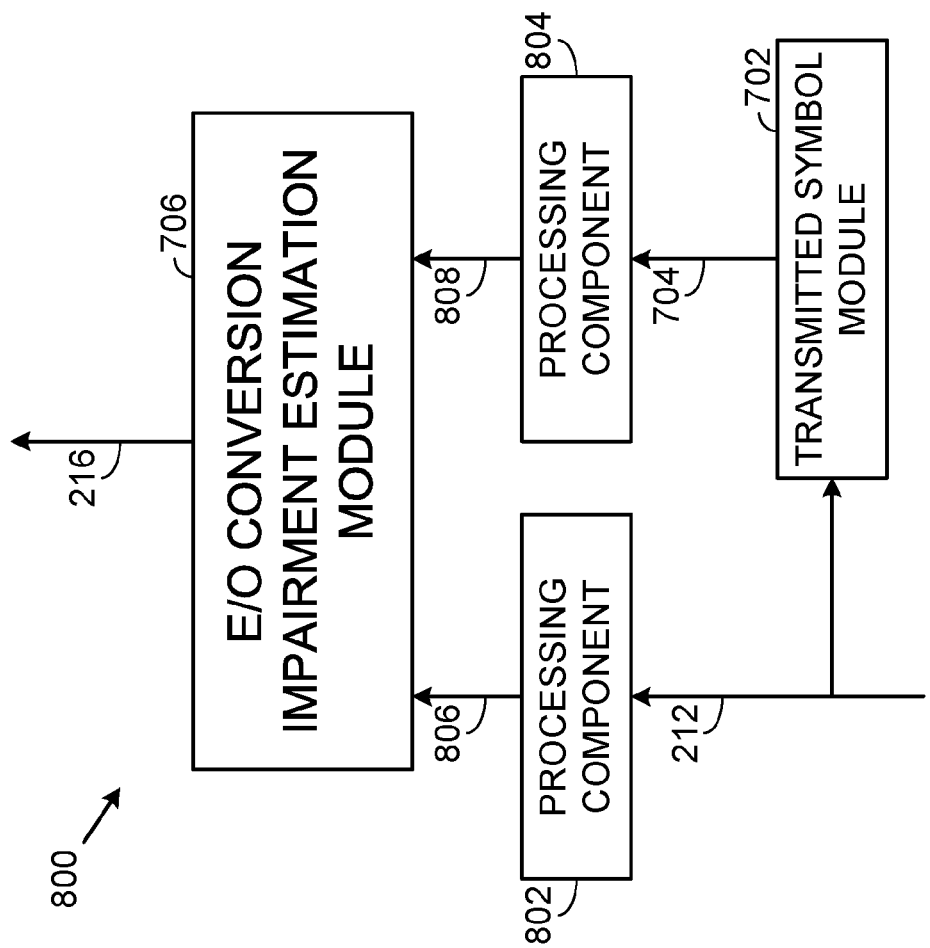
Figure 9:
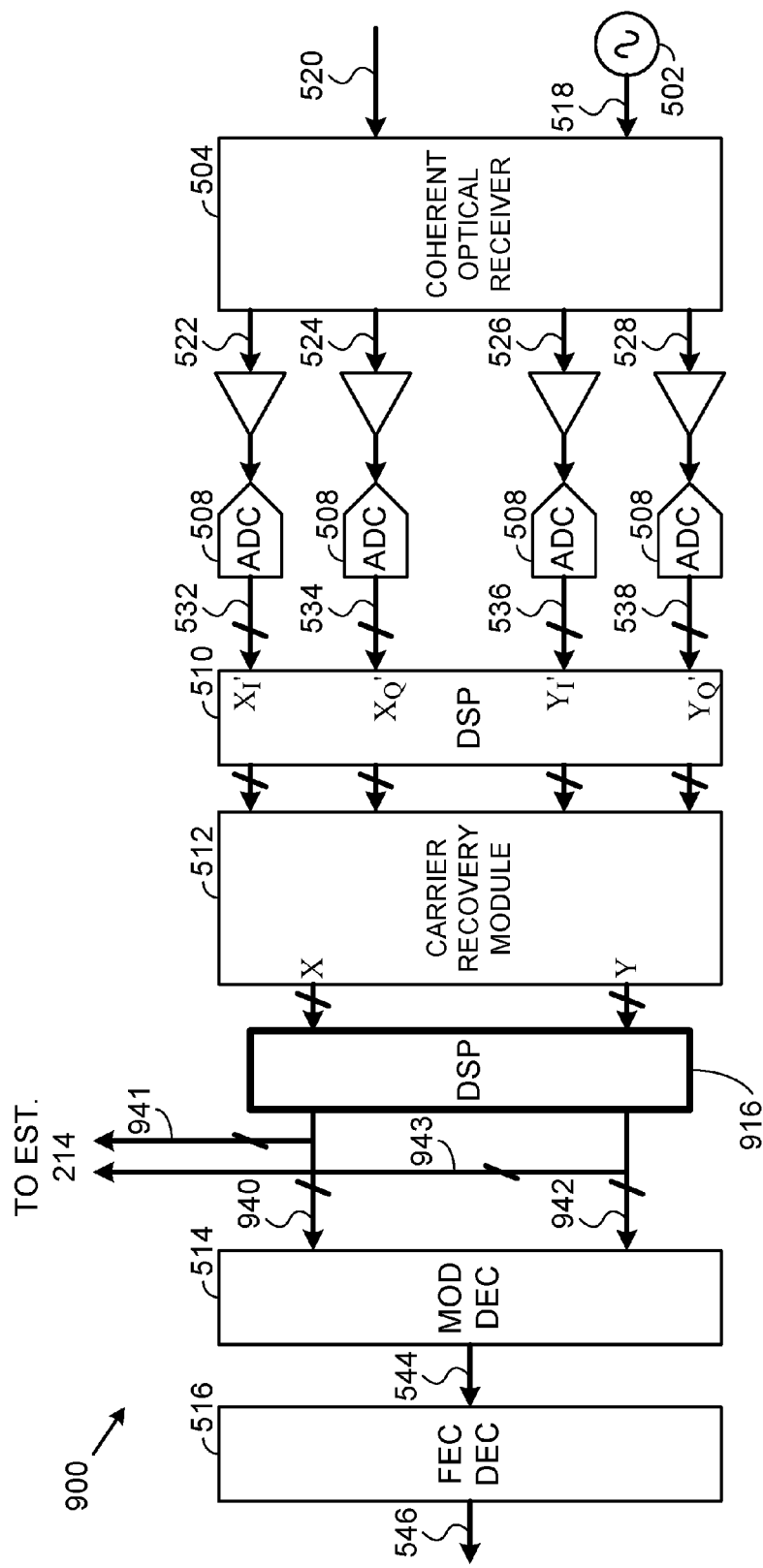

FIG. 1 illustrates principles of electrical-to-optical conversion at an example transmitter;
FIG. 2 illustrates an example optical communication system;
FIG. 3 (PRIOR ART) illustrates an example transmitter;
FIG. 4 illustrates another example transmitter;
FIG. 5 illustrates an example receiver;
FIG. 6 illustrates another example receiver;
FIG. 7 illustrates an example estimator;
FIG. 8 illustrates another example estimator;
FIG. 9 illustrates yet another example receiver;
FIG. 10 illustrates a complex plane; and
Appendix A is a derivation of the estimated quadrature angle error.

DETAILED DESCRIPTION

Complex modulation schemes improve spectral efficiency by using all the parameters of a light wave for encoding information: amplitude, polarization and frequency or phase. For a given polarization, the electric field envelope at any instant of a modulated light wave can be described in the complex plane as a location on an I/Q diagram. I is the in-phase or real part, and Q is the quadrature or imaginary part. A symbol (also called a "constellation point") is defined by its (I,Q) values, or in polar coordinates by amplitude E and phase φ.

An optical signal is composed of a modulated optical carrier. The optical carrier comprises two orthogonal polarized components, for example an X-polarized component and a Y-polarized component. Two dimensions (in-phase and quadrature) of each polarized component have been modulated according to a respective two of the analog electrical signals, for example, an analog in-phase electrical signal $X_I$ and an analog quadrature electrical signal $X_Q$ for the X-polarized component, and an analog in-phase electrical signal $Y_I$ and an analog quadrature electrical signal $Y_Q$ for the Y-polarized component.

FIG. 1 illustrates the principles of electrical-to-optical conversion at a transmitter. A continuous wave (CW) optical carrier 100 is generated by a laser 102 and modulated by a Mach-Zehnder interferometer 104. The CW optical carrier is split into two beams. One beam follows a path where the beam is modulated by a Mach-Zehnder interferometer 106 that is driven by an analog in-phase electrical signal $D_I$ (for example, $X_I$ or $Y_I$) to produce an in-phase modulated carrier 108, represented mathematically as $D_I \cdot \cos[\omega(t-\tau)]$. The other beam follows a path where the beam is modulated by a Mach-Zehnder interferometer 110 that is driven by an analog quadrature electrical signal $D_Q$ (for example, $X_Q$ or $Y_Q$), and then phase shifted by a phase shifter 112, to produce a quadrature modulated carrier 114, represented mathematically as $g \cdot D_Q \cdot \sin[\omega t+\theta]$. The two modulated beams are then combined into a single beam 116.

In non-ideal electrical-to-optical conversion, there is a non-zero time delay (also known as "timing skew") between the in-phase modulated carrier 108 and the quadrature modulated carrier 114, the phase difference between the in-phase modulated carrier 108 and the quadrature modulated carrier 114 is not exactly 90 degrees $$\left(\frac{\pi}{2} \text{radians}\right),$$

between the in-phase modulated carrier 108 and the quadrature modulated carrier 114. In FIG. 1, the timing skew is illustrated by an IQ timing skew factor τ, the phase difference is illustrated by a quadrature angle error θ, and the power imbalance is illustrated by a gain factor g. Collectively, the IQ timing skew, quadrature angle error and IQ power imbalance are referred to in this disclosure as electrical-to-optical (E/O) conversion impairments induced at the transmitter.

The primary causes of E/O conversion impairments induced at the transmitter include differential delays and amplitudes as well as non-orthogonality in the I and Q fields delivered to the modulator output. These are typically minimized once at start of life by factory calibration. Some are, in addition, corrected over life using control methods local to the transmitter. Implemented impairments over life remain due to any local control error as well as error and drift in calibration which may be caused by aging of transmitter components, thermal effects, and humidity effects. Rates of change of measurable impairments are on the order of seconds to minutes to even longer durations.

In conventional transmitters, IQ power imbalance is handled by dead reckoning calibration at the start of life, and local control solutions at the transmitter during service are awkward as they require dedicated O/E conversion hardware. If the IQ power imbalance were estimated or measured at a conventional receiver, an attempt to correct the IQ power imbalance at the conventional receiver would not fully recover the induced performance degradation.

In conventional transmitters, a local control solution at the transmitter for correction of IQ timing skew and quadrature angle error requires dithers and loop SNR considerations such that temporary misalignment produced by a practical dither constitutes a non-negligible noise. The equivalent noise of a given IQ timing skew is pro-rated to the transceiver baud and, to affect cost reduction, baud generally increases with successive transceiver product generations. Thus, the use of dithers as a means of E/O converter control becomes more problematic as the transceiver product advances.

This disclosure proposes generating a digital instruction regarding the one or more E/O conversion impairments induced at the transmitter. In some implementations, the digital instruction is used by the transmitter to reduce the E/O conversion impairments. In other implementations, the digital instruction is used by the receiver to compensate for the E/O conversion impairments.

FIG. 2 illustrates an example optical communication system 200. A transmitter 202 is operative to produce a transmitted optical signal 204 which is transmitted over a transmission medium 206 to a receiver 208 that receives a received optical signal 210. In some implementations, the transmission medium 206 comprises optical fibers, optical amplifiers, optical filters, optical switches, and optical add-drop multiplexers. In other implementations, the optical communication system 200 occurs between satellites through near-vacuum. The receiver 208 is operative to derive received symbols 212 from the received optical signal 210. The transmitted optical signal 204 conveys data. In some implementations, the receiver 208 makes decisions to reconstruct the data. In other implementations, the receiver 208 makes decisions regarding the received symbols 212 to derive encoded bits, and then decodes the encoded bits with error correction to reconstruct the data. The transmission medium 206 is bi-directional. The receiver 208 is operative to transmit information to the transmitter 202, and the transmitter 202 is operative to receive the information from the receiver 208.

In use, the transmitter 202 induces one or more E/O conversion impairments in the transmitted optical signal 204. An estimator 214 is operative to generate from the received symbols 212 a digital instruction 216 regarding the one or more E/O conversion impairments induced at the transmitter 202. Details regarding the operation of the estimator 214 are described below.

In one implementation, the estimator 214 is located at the receiver 208 and provides the digital instruction 216 to the receiver 208, and the receiver 208 is operative to compensate for the one or more E/O conversion impairments according to the digital instruction 216. This implementation may use a prior art transmitter such as described below with respect to FIG. 3 or any other suitable transmitter. An example receiver that is operative to compensate for the one or more E/O conversion impairments is described below with respect to FIG. 6.

In another implementation, the estimator 214 is located at the receiver 208 and uses the receiver 208 to provide the digital instruction 216 to the transmitter 202 over a channel (not shown), and the transmitter 202 is operative to reduce the one or more E/O conversion impairments according to the digital instruction 216. An example transmitter that is operative to reduce the one or more E/O conversion impairments is described below with respect to FIG. 4. This implementation may use a receiver such as described below with respect to FIG. 5 or a receiver such as described below with respect to FIG. 6 or any other suitable receiver. This implementation may use a receiver such as described below with respect to FIG. 9 that corrects distortions resulting from the one or more E/O conversion impairments, so that the transmitter 202 is operative to reduce the part of the one or more E/O conversion impairments that are not compensated at the receiver.

In a further implementation, the estimator 214 is located at the receiver 208 and provides the digital instruction 216 to the receiver 208 and uses the receiver 208 to provide the digital instruction 216 to the transmitter 202 over a channel (not shown). In this implementation, the transmitter 202 is operative to reduce partially the one or more E/O conversion impairments according to the digital instruction 216, and the receiver 208 is operative to compensate partially for the one or more E/O conversion impairments according to the digital instruction 216. An example receiver that is operative to compensate for the one or more E/O conversion impairments is described below with respect to FIG. 6. An example transmitter that is operative to reduce the one or more E/O conversion impairments is described below with respect to FIG. 4.

In yet another implementation, the estimator 214 is located at the transmitter 202, and the receiver 208 is operative to provide the received symbols 212 to the transmitter 202 over a channel (not shown) for use by the estimator. In this implementation, the transmitter 202 is operative to reduce the one or more E/O conversion impairments according to the digital instruction 216. An example transmitter that is operative to reduce the one or more E/O conversion impairments is described below with respect to FIG. 4. This implementation may use a receiver such as described below with respect to FIG. 5 or a receiver such as described below with respect to FIG. 6 or any other suitable receiver. In a variant of this implementation (not illustrated in FIG. 2), the functionality of the estimator 214 is split between a first portion that is located at the receiver 208 and a second portion that is located at the transmitter 202, with the first portion using the receiver 208 to provide to the second portion information derived from the received symbols 212 and from which the digital instruction 216 can be derived.

It is expected that the received optical signal 210 has the same E/O conversion impairments that were induced by the transmitter 202 in the transmitted optical signal 204. Stated differently, it is not believed that the transmission medium 206 induces in the received optical signal 210 any further IQ timing skew, quadrature angle error or IQ power imbalance beyond the E/O conversion impairments that are already present in the transmitted optical signal 204.

FIG. 3 (PRIOR ART) illustrates an example transmitter 300. The transmitter 300 is an example of the transmitter 202. The transmitter 300 comprises a forward error correction (FEC) encoder 304 coupled to a modulation encoder 306 coupled to a digital signal processor (DSP) 308 coupled to digital-to-analog converters 310 coupled to radio frequency (RF) drivers 312 coupled to E/O converters 314. The DSP 308 comprises one or more digital pulse-shaping filters 316. A description of the transmitter 300 in operation follows.

The FEC encoder 304 applies an FEC algorithm to incoming digital data 318 to encode the digital data 318 into coded bits 320. The incoming digital data 318 may be comprised to two separate data streams that are encoded separately into two separate streams of coded bits. The modulation encoder 306 maps the coded bits 320 to symbols of a constellation comprising a first polarization (for example, an X polarization) and a second polarization (for example, a Y polarization) that is orthogonal to the first polarization. The DSP 308 receives as input the symbol instructions 324 for the X-polarization and performs spectral shaping and optionally additional processing, thus producing a digital in-phase $X_I$ signal 326 and a digital quadrature $X_Q$ signal 328. The DSP 308 receives as input the symbol instructions 330 for the Y-polarization and performs spectral shaping and optionally additional processing, thus producing a digital in-phase $Y_I$ signal 332 and a digital quadrature $Y_Q$ signal 334. The digital-to-analog converters 310 convert the digital signals 326, 328, 332 and 334 into respective analog electrical signals 336, 338, 342 and 344. The symbols 324, 330 are referred to in this disclosure as "transmitted symbols".

A first of the E/O converters 314 converts the analog in-phase $X_I$ electrical signal 336 and the analog quadrature $X_Q$ electrical signal 338 into a first polarized optical signal 346, in keeping with the principles of electrical-to-optical conversion described above with respect to FIG. 1. The first E/O converter 314 induces one or more first electrical-to-optical impairments in the first polarized optical signal 346.

A second of the E/O converters 314 converts the analog in-phase $Y_I$ electrical signal 342 and the analog quadrature $Y_Q$ electrical signal 344 into a first polarized optical signal 348, in keeping with the principles of electrical-to-optical conversion described above with respect to FIG. 1. The second E/O converter 314 induces one or more second electrical-to-optical impairments in the second polarized optical signal 348.

The first polarized optical signal 346 and the second polarized optical signal 348 are combined into a single transmitted optical signal 350. The transmitted optical signal 350 is an example of the transmitted optical signal 204.

FIG. 4 illustrates another example transmitter 400. The transmitter 400 is another example of the transmitter 202. The transmitter 400 differs from the transmitter 300, at least in that the transmitter 400 comprises E/O converters 414 (instead of the E/O converters 314) and a control block 416 to control components of the transmitter 400 to reduce the E/O conversion impairments according to digital instructions 216. The components controlled by the control block 416 include the E/O converters 414 and, optionally, the one or more digital pulse-shaping filters 316 of the DSP 308. The control block 416 may be a generic processor or a dedicated processor or any suitable combination of hardware, firmware and software. A receiver (not shown) that is co-located with the transmitter 400 receives backward transmissions from the receiver 208. For example, the co-located receiver may receive an optical version of the digital instructions 216 over a channel (not shown) and provide the digital instructions 216 to the control block 416.

In response to a digital instruction 216 that identifies a power imbalance induced by one of the E/O converters 414 between an in-phase portion of the polarized optical signal and a quadrature portion of the polarized optical signal, the control block 416 may reduce the power imbalance by adjusting the relative power of the in-phase portion and the quadrature portion prior to their combination into a single polarized optical signal. For example, the control block 416 may control the power of the analog in-phase electrical signal $D_I$ that drives the Mach-Zehnder interferometer 106, for example, by adjusting the gain of a variable gain amplifier 120 (see FIG. 1). Alternatively, the control block 416 may control the power of the analog quadrature electrical signal $D_Q$ that drives the Mach-Zehnder interferometer 110, for example, by adjusting the gain of a variable gain amplifier 122 (see FIG. 1). In another alternative, the control block 416 may scale the taps of the one or more digital pulse-shaping filters 316 to separately affect the analog in-phase electrical signal $D_I$ that drives the Mach-Zehnder interferometer 106 and the analog quadrature electrical signal $D_Q$ that drives the Mach-Zehnder interferometer 110. In a further alternative, the control block 416 may reduce the power imbalance via a combination of two or three of the techniques described above.

In response to a digital instruction 216 that identifies a timing skew induced by one of the E/O converters 414 between an in-phase portion of the polarized optical signal and a quadrature portion of the polarized optical signal, the control block 416 may reduce the timing skew through adjustment of the taps of the one or more digital pulse-shaping filters 316 in the DSP 308 to apply a time shift to the digital signal. Alternatively, the control block 416 may reduce the timing skew through use of a phase shifter (not shown) acting on the analog electrical signal or acting on the optical signal. In a further alternative, the control block 416 may reduce the timing skew partially through adjustment of the one or more digital pulse-shaping filters 316 in the DSP 308 and partially through use of a phase shifter (not shown) acting on the analog electrical signal or acting on the optical signal. Fine adjustment of the timing skew may be accomplished more successfully in the digital domain, and coarse adjustment of the timing skew may be accomplished more successfully in the analog domain.

In response to a digital instruction 216 that identifies a quadrature angle error induced by one of the E/O converters 414, the control block 416 may reduce the quadrature angle error by adjusting a relative phase of the in-phase portion of the polarized optical signal and the quadrature portion of the polarized optical signal. For example, the control block 416 may adjust the phase shifter 112 of that E/O converter 414. Alternatively or additionally, the control block 416 may adjust the taps on the one or more digital pulse-shaping filters 316 to reduce the quadrature angle error. Alternatively or additionally, the control block 416 may control the one or more digital pulse-shaping filters 316 to perform a filtering technique such as described in U.S. Pat. No. 7,769,305 to reduce the quadrature angle error.

FIG. 5 illustrates an example receiver 500. The receiver 500 is an example of the receiver 208. The receiver 500 comprises a local oscillator 502 coupled to a coherent optical receiver 504 coupled to RF drivers 506 coupled to analog-to-digital converters 508 coupled to a DSP 510 coupled to a carrier recovery module 512 coupled to a modulation decoder 514 coupled to a FEC decoder 516. A description of the receiver 500 in operation follows.

A continuous wave (CW) signal 518 produced by the local oscillator 502 and a received optical signal 520 are input to the coherent optical receiver 504. The coherent optical receiver 504 performs optical-to-electrical (O/E) conversion for a first polarization (for example, an X polarization) and for a second polarization (for example, a Y polarization) that is orthogonal to the first polarization. The coherent optical receiver 504 produces an analog in-phase $X_I'$ electrical signal 522, an analog quadrature $X_Q'$ electrical signal 524, an analog in-phase $Y_I'$ electrical signal 526, and an analog quadrature $Y_Q'$ electrical signal 528. The RF drivers 506 amplify the analog electrical signals 522, 524, 526, 528 and the analog-to-digital converters 508 sample the amplified signals to produce digital in-phase $X_I'$ signal 532, digital quadrature $X_Q'$ signal 534, digital in-phase $Y_I'$ signal 536, and digital quadrature $Y_Q'$ signal 538.

The coherent optical receiver 504 induces O/E conversion impairments that are similar to the E/O conversion impairments induced at the transmitter. There is a frequency offset between the local oscillator 502 and continuous wave optical carrier generated by the laser at the transmitter. This frequency offset causes a phase drift (spinning the signal in the complex plane) that is corrected by the carrier recovery module 512. As a result of the spinning, the receiver O/E conversion impairments are eliminated in the estimator 214 when the estimated values are averaged over many received symbols.

The DSP 510 receives as input the digital signals 532, 534, 536 and 538 and performs digital filtering, clock recovery, polarization recovery, and other processing. For example, the DSP 510 may perform chromatic dispersion compensation. The DSP 510 may include an adaptive multiple-in multiple-out (MIMO) filter. Typically, the signal processing performed by the DSP 510 substantially effects an inverse of the channel over which the optical signal 520 was received.

The carrier recovery module 512 processes the output of the DSP 510 and derives received symbols 540, 542 for the two orthogonal polarizations. The received symbols 540, 542 (or a subset of the received symbols 540, 542) are examples of the received symbols 212 that are provided to the estimator 214. This is illustrated in FIG. 5 by arrows 541 and 543.

The modulation decoder 514 makes decisions regarding the received symbols 540, 542 to derive encoded bits 544, and then the FEC decoder 516 decodes the encoded bits 544 with error correction to reconstruct the data 546.

FIG. 6 illustrates another example receiver 600. The receiver 600 is another example of the receiver 208. The receiver 600 differs from the receiver 500, at least in that the receiver 600 comprises a DSP 616 to compensate for the E/O conversion impairments according to digital instructions 216. The DSP 616 receives as input the same received symbols 540, 542 that are provided to the estimator 214 and based on which the estimator 214 generates the digital instructions 216. For example, the DSP 616 may adjust the decision boundaries that determine whether a received constellation point is one transmitted symbol or a different transmitted symbol, in order to compensate for the E/O conversion impairments.

The estimator 214 can be implemented in hardware, firmware, software, or a combination thereof. Implementations of the estimator 214 may involve use of physical, tangible computer-readable media that store instructions which, when executed by a processor, result in the calculations described below.

The following nomenclature is used in the discussion of the operation of the estimator 214. The transmitted symbols for one of the polarizations are $x[n]=a[n]+jb[n]$ and the received symbols 212 for that one of the polarization are $s[n]=c[n]+jd[n]$. In the frequency domain, $A[k]$ is the Fourier Transform (FT) of $a[n]$; $B[k]$ is the FT of $b[n]$; $C[k]$ is the FT of $c[n]$; and $D[k]$ is the FT of $d[n]$.

The estimator 214 uses a power difference between real (in-phase) and imaginary (quadrature) parts of the received symbols 212 to generate the digital instruction 216 regarding the IQ power imbalance induced at the transmitter 202. For example, assuming that the in-phase and quadrature parts of the transmitted symbols have the same power (prior to pulse shaping, digital-to-analog conversion, and electrical-to-optical conversion at the transmitter 202), then the power imbalance, in decibels, can be estimated as follows:

$$\text{Power Imbalance[dB]} = 10\log_{10}\frac{E[c[n]^2]}{E[d[n]^2]} \qquad \text{(Equation 1)}$$

where E is the expected value, that is, a summation over time. For each transmitter polarization, the digital instruction 216 generated by the estimator 214 may convey the estimated power imbalance by including the power imbalance value, or an identification of the highest or lowest power phase, or some other digital representation of one of this information.

The estimator 214 uses a cross-correlation of real (in-phase) and imaginary (quadrature) parts of the received symbols 212 to generate the digital instruction 216 regarding the quadrature angle error induced at the transmitter 202. For example, the quadrature angle error θ can be estimated as follows:

$$\theta \approx \arcsin\frac{2 \cdot E[c[n]\cdot d[n]]}{E[c[n]^2 + d[n]^2]} \qquad \text{(Equation 2)}$$

where E is the expected value, that is, a summation over time. The expression $E[c[n]\cdot d[n]]$ is a measure of the cross-correlation of the real and imaginary parts of the received symbols 212. The expression $E[c[n]^2+d[n]^2]$ is a measure of power in the received symbols. The digital instruction 216 generated by the estimator 214 may convey the quadrature angle error by including a present value of the quadrature angle error, or a direction of change to achieve orthogonality, or some other digital representation of a control error signal. Appendix A provides a derivation of Equation 2.

The estimator 214 uses a phase difference in the frequency domain between i) real parts of the received symbols 212 and the transmitted symbols and ii) imaginary parts of the received symbols 212 and the transmitted symbols to generate the digital instruction 216 regarding the timing skew induced at the transmitter 202. The received symbols 212 may correspond to known transmitted symbols, for example, training symbols used to calibrate or test the system 200. In cases where the received symbols 212 correspond to known transmitted symbols (which are stored at the receiver 208 and provided by the receiver 208 to the estimator 214), the estimator 214 uses the received symbols 212 and the known transmitted symbols to generate the digital instruction 216 regarding the timing skew induced at the transmitter 202. In cases where the received symbols 212 do not correspond to known transmitted symbols, the estimator 214 derives transmitted symbols from the received symbols 212 by performing a decision, which may include error correction, on the received symbols 212, and the estimator 214 then uses the received symbols 212 and the derived transmitted symbols to generate the digital instruction 216 regarding the timing skew induced at the transmitter 202.

For example, the timing skew τ can be estimated based on a least-square linear regression as follows:

$$\tau = \frac{1}{2\pi}\frac{\Sigma[\theta[k]-\bar{\theta}](k-\bar{k})}{\Sigma(k-\bar{k})^2} \qquad \text{(Equation 3)}$$

where θ[k] is a phase difference in the frequency domain defined as follows:

$$\theta[k]=<P_Q[k]<P_Q[k] \qquad \text{(Equation 4)}$$

and the horizontal bar over $\bar{\theta}$ and $\bar{k}$ indicates an arithmetic mean.

$P_I[k]$ is defined as the product of the frequency-domain signal of the real part of the received symbol and the conjugate of the frequency-domain signal of the real part of the transmitted symbol, averaged across FT blocks to suppress noise interference:

$$P_I[k] = \langle C[k] \cdot A^*[k] \rangle_{FT\_blocks} \quad \text{(Equation 5)}$$

$P_Q[k]$ is defined as the product of the frequency-domain signal of the imaginary part of the received symbol and the conjugate of the frequency-domain signal of the imaginary part of the transmitted symbol, averaged across FT blocks to suppress noise interference:

$$P_Q[k] = \langle D[k] \cdot B^*[k] \rangle_{FT\_blocks} \quad \text{(Equation 6)}$$

FIG. 7 illustrates an example estimator 700. The estimator 700 is an example of the estimator 214. A transmitted symbol module 702 determines transmitted symbols 704. The transmitted symbol module 702 may derive the transmitted symbols 704 from the received symbols 212 by performing a hard decision on the received symbols 212. Alternatively, the transmitted symbol module 702 may determine the transmitted symbols 704 to be known transmitted symbols that are stored in the receiver 208 and provided by the receiver 208 to the estimator 700.

An E/O conversion impairment estimation module 706 receives as input the received symbols 212 that are derived at the receiver 208 and the transmitted symbols 704 that are determined by the transmitted symbol module 704. The E/O conversion impairment estimation module 702 performs the calculations described above on its input and outputs the digital instructions 216.

FIG. 8 illustrates another example estimator 800. The estimator 800 is another example of the estimator 214. The estimator 800 differs from the estimator 700, at least in that the estimator 800 comprises a processing component 802 and a processing component 804.

In some implementations, the transmitter 202 performs additional processing that mixes the in-phase and quadrature portions of the transmitted symbols prior to the electrical-to-optical conversion at the transmitter 202. Such additional processing may include chromatic dispersion pre-compensation, and Jones rotation to mitigate the performance degradation caused by polarization dependent loss. For example, the DSP 308 in the transmitter 300 or in the transmitter 400 may perform such additional processing. The estimator 800 is appropriate for these implementations. The processing component 802 applies the same additional processing to the received symbols 212 to generate processed received symbols 806. The processing component 804 applies the same additional processing to the transmitted symbols 704 to generate processed transmitted symbols 808. The E/O conversion impairment estimation module 706 receives as input the processed received symbols 806 and the processed transmitted symbols 808. The E/O conversion impairment estimation module 706 performs the calculations described above on its input and outputs the digital instructions 216.

FIG. 9 illustrates another example receiver 900. The receiver 900 is another example of the receiver 208. The receiver 900 differs from the receiver 500, at least in that the receiver 900 comprises a DSP 916 that corrects IQ distortions resulting from the E/O conversion impairments. The power imbalance between an in-phase portion of the transmitted optical signal and a quadrature portion of the transmitted optical signal results in different signal-to-noise ratios (SNR) on the I and Q tributaries at the receiver 900, despite the correction of the IQ distortions by the DSP 916. The quadrature angle error at the transmitter 202 results in noise correlation between the I and Q tributaries at the receiver 900, despite the correction of the IQ distortions by the DSP 916. Received symbols 940, 942 are output from the DSP 916 and are provided to the estimator 214, as illustrated in FIG. 9 by arrows 941 and 943. The estimator 214 generates the digital instruction 216 based on the received symbols 940, 942. In this situation, the estimator 214 estimates the power imbalance using the variance difference between real (in-phase) and imaginary (quadrature) parts of the noise. In this situation, the estimator 214 estimates the quadrature angle error using the covariance between real (in-phase) and imaginary (quadrature) parts of the noise. The digital instruction 216 is sent to the transmitter 202, and the transmitter 202 reduces the one or more electrical-to-optical conversion impairments according to the digital instruction 216.

The scope of the claims should not be limited by the details set forth in the examples, but should be given the broadest interpretation consistent with the description as a whole.

APPENDIX A

In non-ideal electrical-to-optical conversion at the transmitter, the phase difference between the in-phase modulated carrier and the quadrature modulated carrier is not exactly 90 degrees $$\left(\frac{\pi}{2} \text{radians}\right).$$

This deviation from 90 degrees $$\left(\frac{\pi}{2} \text{radians}\right)$$

is referred to in this disclosure as the quadrature angle error induced at the transmitter.

The in-phase (I) and quadrature (Q) components of a complex symbol can be graphed on a complex plane (also known as an Argand plane). The axes of the complex plane are supposed to be orthogonal. The quadrature angle error θ can be visualized as the amount by which the angle between a real, in-phase axis of the complex plane and an imaginary, quadrature axis of the complex plane is less than 90 degrees $$\left(\frac{\pi}{2} \text{radians}\right).$$

This is illustrated in FIG. 19, where I and Q represent ideal axes of the complex plane and Î and Q̂ represent actual axes of the complex plane for a polarized component of a transmitted optical signal.

The transmitted symbols for one of the polarizations are x[n]=a[n]+jb[n] and the received symbols for that one of the polarization are s[n]=c[n]+jd[n]. The relationship of the real and imaginary parts of the received symbols to the real and imaginary parts of the transmitted symbols can be expressed as follows:

$$\begin{bmatrix} c[n] \\ d[n] \end{bmatrix} = \begin{bmatrix} \cos\left(\frac{\theta}{2}\right) & \sin\left(\frac{\theta}{2}\right) \\ \sin\left(\frac{\theta}{2}\right) & \cos\left(\frac{\theta}{2}\right) \end{bmatrix} \begin{bmatrix} a[n] \\ b[n] \end{bmatrix}. \quad \text{(Equation A.1)}$$

Therefore $$c[n] = a[n]\cos\left(\frac{\theta}{2}\right) + b[n]\sin\left(\frac{\theta}{2}\right)$$

and $$d[n] = a[n]\sin\left(\frac{\theta}{2}\right) + b[n]\cos\left(\frac{\theta}{2}\right).$$

Calculating $$c[n]^2 + d[n]^2 \text{ yields } a[n]^2 + b[n]^2 + 4a[n]b[n]\sin\left(\frac{\theta}{2}\right)\cos\left(\frac{\theta}{2}\right).$$

Over time, there is no correlation between a [n] and b[n], and therefore the sum of the latter term over time for many samples is expected to be neglible, and the expected value $$E\left[4a[n]b[n]\sin\left(\frac{\theta}{2}\right)\cos\left(\frac{\theta}{2}\right)\right]$$

is effectively zero. Thus the quantity $c[n]^2$ d $[n]^2$ (representing received power) is effectively equal to the quantity a $[n]^2$ b $[n]^2$ (representing transmitted power). It should be noted that c[n] and d[n] also contain noise at the receiver and therefore the quantity $c[n]^2$ d $[n]^2$ is not exactly identical to the quantity a $[n]^2$ b $[n]^2$.

Calculating the cross-correlation c[n]·d[n] of real (in-phase) and imaginary (quadrature) parts of the received symbols yields the following equation:

$$c[n] \cdot d[n] = \frac{1}{2}\sin\theta[a[n]^2 + b[n]^2] + a[n]b[n]. \quad \text{(Equation A.2)}$$

Over time, there is no correlation between a [n] and b[n], and therefore the sum of the latter term over time for many samples is expected to be neglible, and the expected value E[a[n]b[n]] is effectively zero. Substituting the quantity $c[n]^2+d[n]^2$ for the quantity a $[n]^2+b[n]^2$ in Equation A.2, and then isolating θ results in the following equation:

$$\theta \approx \arcsin\frac{2 \cdot E[c[n] \cdot d[n]]}{E[c[n]^2 + d[n]^2]}. \quad \text{(Equation A.3)}$$

What is claimed is:

1. An optical communication system comprising:
a transmitter operative to produce and transmit a transmitted optical signal over a transmission medium, the transmitter operative to induce one or more electrical-to-optical conversion impairments in the transmitted optical signal;
a receiver operative to receive a received optical signal over the transmission medium and to derive received symbols from the received optical signal; and
an estimator operative to generate from the received symbols a digital instruction regarding the one or more electrical-to-optical conversion impairments induced at the transmitter,
wherein the one or more electrical-to-optical conversion impairments comprise quadrature angle error, and the estimator is operative to use a cross-correlation of real and imaginary parts of the received symbols to generate the digital instruction regarding the quadrature angle error.

2. An optical communication system comprising:
a transmitter operative to produce and transmit a transmitted optical signal over a transmission medium, the transmitter operative to induce one or more electrical-to-optical conversion impairments in the transmitted optical signal;
a receiver operative to receive a received optical signal over the transmission medium and to derive received symbols from the received optical signal; and
an estimator operative to generate from the received symbols a digital instruction regarding the one or more electrical-to-optical conversion impairments induced at the transmitter,
wherein the transmitter is operative to reduce the one or more electrical-to-optical conversion impairments according to the digital instruction, and
wherein the one or more electrical-to-optical conversion impairments comprise quadrature angle error, and the estimator is operative to use a covariance of real and imaginary parts of noise after compensation at the receiver of the one or more electrical-to-optical conversion impairments to generate the digital instruction regarding the quadrature angle error.

3. An optical communication system comprising:
a transmitter operative to produce and transmit a transmitted optical signal over a transmission medium, the transmitter operative to induce one or more electrical-to-optical conversion impairments in the transmitted optical signal;
a receiver operative to receive a received optical signal over the transmission medium and to derive received symbols from the received optical signal; and
an estimator operative to generate from the received symbols a digital instruction regarding the one or more electrical-to-optical conversion impairments induced at the transmitter,
wherein the transmitter is operative to reduce the one or more electrical-to-optical conversion impairments according to the digital instruction, and
wherein the one or more electrical-to-optical conversion impairments comprise a power imbalance between an in-phase portion of the transmitted optical signal and a quadrature portion of the transmitted optical signal, and the estimator is operative to use a power difference between real and imaginary parts of noise after compensation at the receiver of the one or more electrical-to-optical conversion impairments to generate the digital instruction regarding the power imbalance.

4. An optical communication system comprising:
a transmitter operative to produce and transmit a transmitted optical signal over a transmission medium, the transmitter operative to induce one or more electrical-to-optical conversion impairments in the transmitted optical signal;
a receiver operative to receive a received optical signal over the transmission medium and to derive received symbols from the received optical signal; and
an estimator operative to generate from the received symbols a digital instruction regarding the one or more electrical-to-optical conversion impairments induced at the transmitter,
wherein the transmitted optical signal comprises two orthogonally-polarized optical signals, the receiver is operative to derive first received symbols for a first polarization state and second received symbols for a second polarization state, and the estimator is operative to generate a first digital instruction regarding one or more electrical-to-optical conversion impairments for the first polarization state from the first received symbols and to generate a second digital instruction regarding one or more electrical-to-optical conversion impairments for the second polarization state.

5. The optical communication system recited in claim 4, wherein the estimator is located at the receiver, and the receiver is operative to compensate for the one or more electrical-to-optical conversion impairments according to the digital instruction.

6. The optical communication system recited in claim 4, wherein the transmitter is operative to reduce the one or more electrical-to-optical conversion impairments according to the digital instruction.

7. The optical communication system recited in claim 6, wherein the estimator is located at the transmitter, and the receiver is operative to provide the received symbols to the transmitter over a channel for use by the estimator.

8. The optical communication system recited in claim 6, wherein the estimator is located at the receiver, and the estimator is operative to use the receiver to provide the digital instruction to the transmitter over a channel.

9. An optical transmitter comprising:
a forward error correction (FEC) encoder to encode data into coded bits;
a modulation encoder to map the coded bits to symbols of a constellation for a first polarization and for a second polarization that is orthogonal to the first polarization;
a digital signal processor to perform spectral shaping of the symbols, thus producing digital in-phase and quadrature signals for each of the polarizations;
digital-to-analog converters to convert the digital in-phase and quadrature signals to respective analog in-phase and quadrature electrical signals;
a first electrical-to-optical (E/O) converter to convert the analog in-phase and quadrature electrical signals for the first polarization to a first polarized optical signal having the first polarization, the first E/O converter inducing one or more first electrical-to-optical conversion impairments in the first polarized optical signal;
a second E/O converter to convert the analog electrical signals for the second polarization to a second polarized optical signal having the second polarization, the second E/O converter inducing one or more second electrical-to-optical conversion impairments in the second polarized optical signal; and
a control block to control at least one component of the transmitter to reduce the one or more first electrical-to-optical conversion impairments according to a first digital instruction and to control at least one component of the transmitter to reduce the one or more second electrical-to-optical conversion impairments according to a second digital instruction,
wherein the first polarized optical signal and the second polarized optical signal are combined into a single transmitted optical signal.

10. The optical transmitter recited in claim 9, wherein the one or more first electrical-to-optical conversion impairments comprise a timing skew between an in-phase portion of the first polarized optical signal and a quadrature portion of the first polarized optical signal, and the transmitter is operative to reduce the timing skew through use of a phase shifter.

11. The optical transmitter recited in claim 9, wherein the one or more first electrical-to-optical conversion impairments comprise a timing skew between an in-phase portion of the first polarized optical signal and a quadrature portion of the first polarized optical signal, and the transmitter is operative to reduce the timing skew through adjustment of the taps of a digital filter in the digital signal processor.

12. The optical transmitter recited in claim 9, wherein the one or more first electrical-to-optical conversion impairments comprise quadrature angle error, and the transmitter is operative to reduce the quadrature angle error by adjusting a relative phase of an in-phase portion of the first polarized optical signal and a quadrature portion of the first polarized optical signal.

13. The optical transmitter recited in claim 9, wherein the one or more first electrical-to-optical conversion impairments comprise a power imbalance between an in-phase portion of the first polarized optical signal and a quadrature portion of the first polarized optical signal, and the transmitter is operative to reduce the power imbalance by adjusting a relative power of the in-phase portion and the quadrature portion prior to the combination of the in-phase portion and the quadrature portion into the first polarized optical signal.

14. An optical receiver comprising:
a local oscillator to generate a continuous wave signal;
a coherent optical receiver to receive a transmitted optical signal over a transmission medium from an optical transmitter and to generate analog in-phase electrical signals and analog quadrature electrical signals from the transmitted optical signal and the continuous wave signal;
analog-to-digital converters to convert the analog in-phase and quadrature electrical signals to respective digital in-phase and quadrature signals;
a first digital signal processor to process the digital in-phase and quadrature signals;
a carrier recovery module to derive received symbols from the processed digital in-phase and quadrature signals;
a second digital signal processor to process the received symbols to compensate, according to a digital instruction, for one or more electrical-to-optical conversion impairments induced at the optical transmitter;
a modulation decoder to make decisions regarding the processed received symbols to derive encoded bits; and
a forward error correction decoder to decode the encoded bits with error correction to reconstruct data.

15. The optical receiver recited in claim 14, wherein the one or more electrical-to-optical conversion impairments comprise a timing skew between an in-phase portion of the transmitted optical signal and a quadrature portion of the transmitted optical signal, and the digital instruction regarding the timing skew is to be generated using a phase difference in the frequency domain between i) real parts of the received symbols and transmitted symbols and ii) imaginary parts of the received symbols and the transmitted symbols.

16. The optical receiver recited in claim 15, wherein the transmitted symbols are known transmitted symbols.

17. The optical receiver recited in claim 15, wherein the transmitted symbols are derived from the received symbols.

18. The optical receiver recited in claim 14, wherein the one or more electrical-to-optical conversion impairments comprise quadrature angle error, and the digital instruction regarding the quadrature angle error is generated using a cross-correlation of real and imaginary parts of the received symbols.

* * * * *